Dec. 13, 1932.  G. C. CARSON  1,890,934
METHOD OF AND MEANS FOR PRODUCING SULPHATES FROM MIXED SULPHIDE
MATERIALS AND THE RECOVERY OF VALUES THEREFROM
Filed April 19, 1930   4 Sheets-Sheet 1
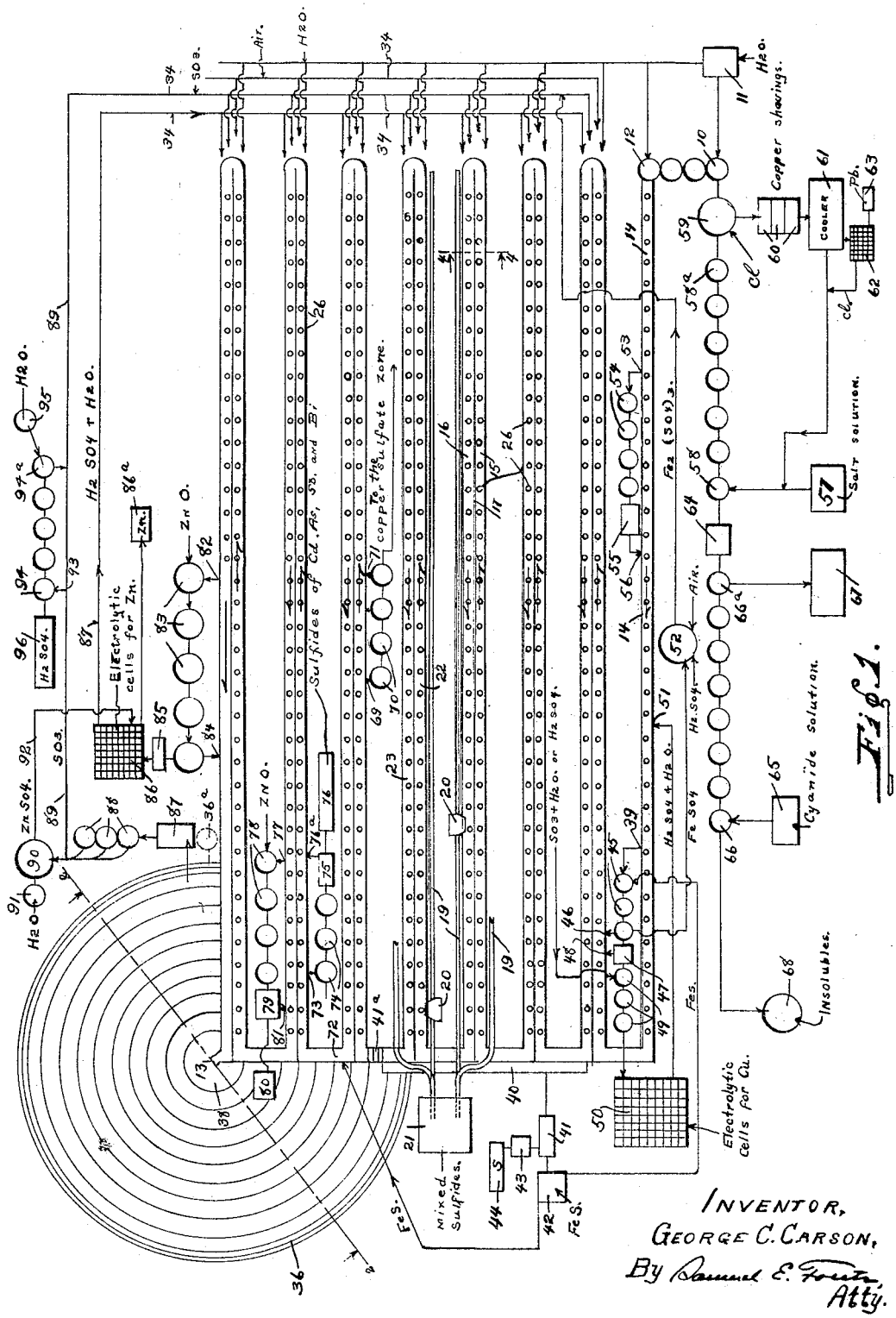
INVENTOR,
GEORGE C. CARSON,
By Samuel E. Foster
Atty.

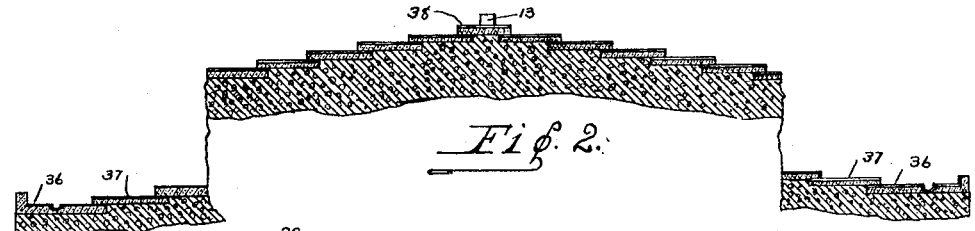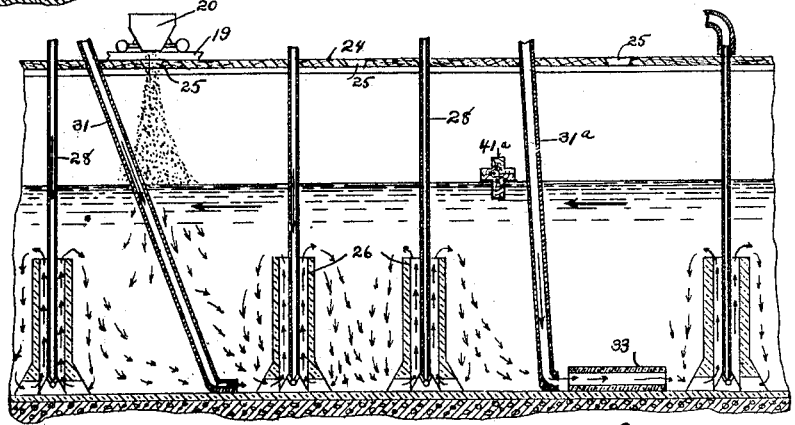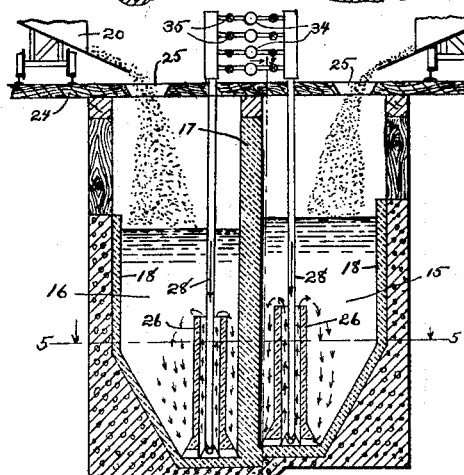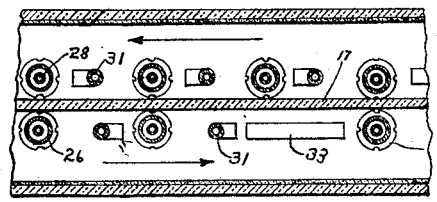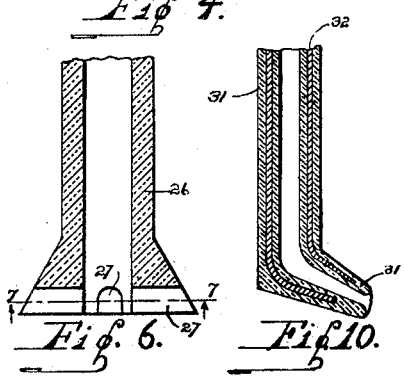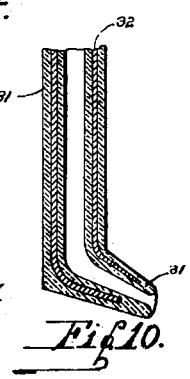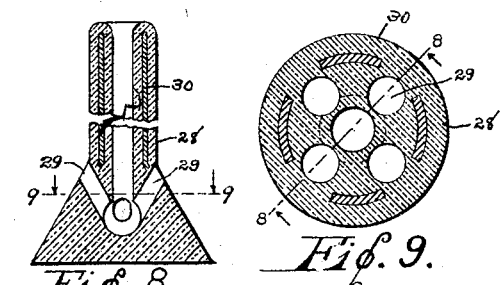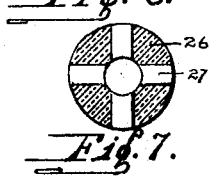

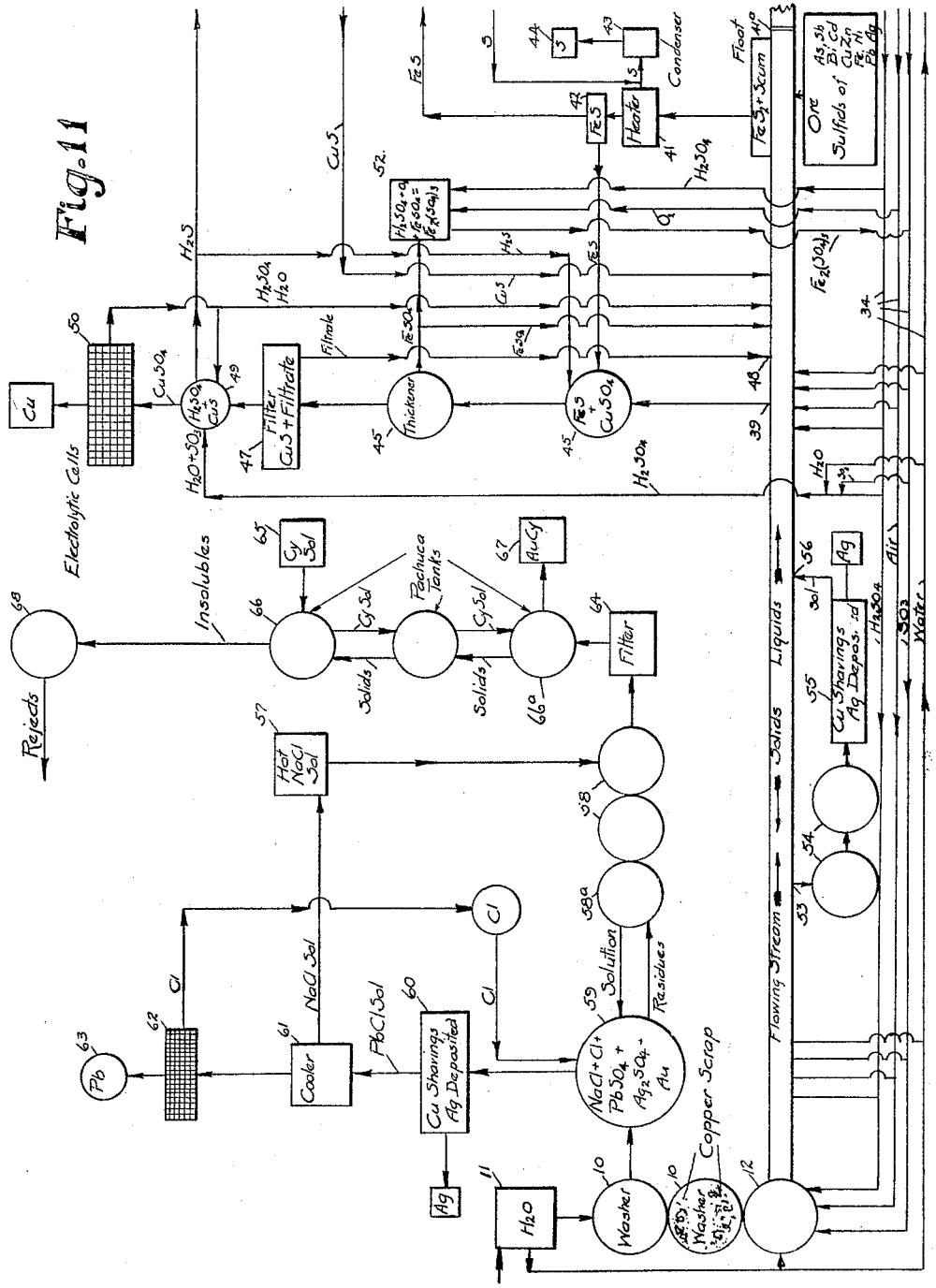

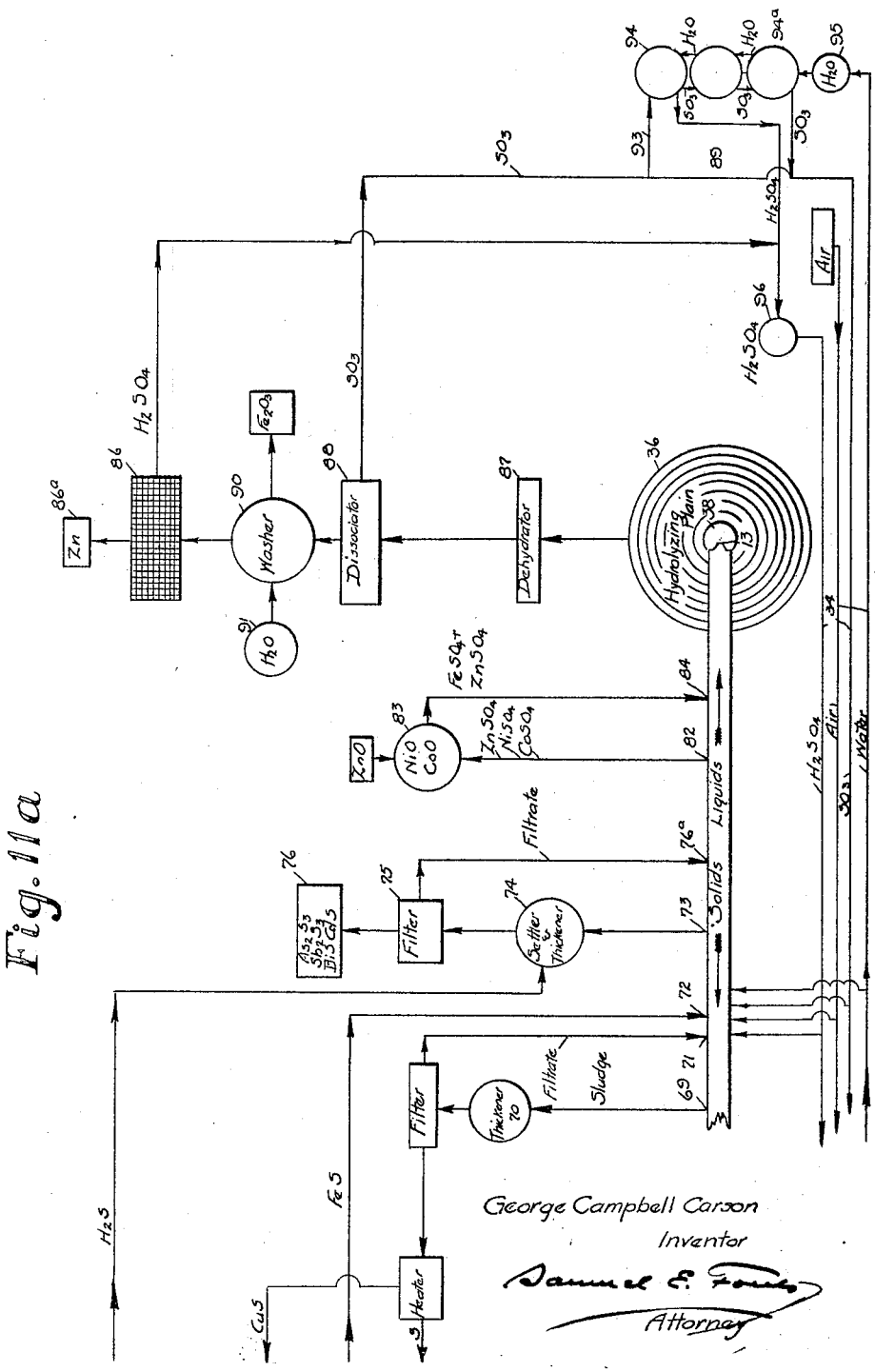

Patented Dec. 13, 1932

1,890,934

UNITED STATES PATENT OFFICE

GEORGE CAMPBELL CARSON, OF LOS ANGELES, CALIFORNIA

METHOD OF AND MEANS FOR PRODUCING SULPHATES FROM MIXED SULPHIDE MATERIALS AND THE RECOVERY OF VALUES THEREFROM

Application filed April 19, 1930. Serial No. 445,779.

My invention relates to the production of sulphates from mixed or complex sulphide materials for the segregation and recovery of their values and to the means employed in carrying out the method. While the specific features of the invention will be set forth hereinafter, it may be stated that it comprises the maintenance of a flowing stream of sulphating agent in liquid form into which the sulphide materials are introduced. The strength of the liquid in the stream is maintained and agitation is produced by introducing acid-forming agents, air or water at any point where needed, and the heat of reaction and dilution keeps the temperature at substantially the boiling point of the liquid. The attack of the agent upon the sulphides, causes a violent ebullition which helps to agitate the sulphides, with the result that the lighter and more soluble particles tend to keep in suspension in the stream and to travel with it while the heavier and more inert particles settle and are caused to advance toward the source of the stream, or counter to the current flow.

Since the sulphides vary in their susceptibility to attack, they change into sulphates which are dissolved in different portions of the stream and the sulphates are, for this reason, roughly separated. When the sulphates are dissolved they flow with the stream into regions where they contact with other more susceptible sulphides which they attack and change into sulphates, with the result that they are themselves returned to the sulphide form and, settling in the stream, are moved back to the regions where they were first sulphated. Thus are the various sulphates segregated for the recovery of their values by appropriate means and methods.

After the process is brought into full operation, the separated sulphates may be sold as such; or they may have their base metals deposited electrolytically; or, with the exception of the sulphates of lead, calcium, barium and the alkaline metals, they may be decomposed into their respective metal oxides and sulphuric anhydride. All of the sulphuric anhydride thus produced is either fed back into the stream as a replenishing agent or is made into the sulphate of hydrogen. This is accomplished by concentrating the sulphuric anhydride in a sulphate, from which it is dissociated by heat, breaking away from its metal oxide as gaseous sulphuric anhydride which is then combined with water to produce the hydrogen sulphate.

The movement of the heavier particles of the sulphides up the stream and their agitation in the liquid keeps their surfaces cleansed and facilitates the reactions, which continue until the last sulphide that is susceptible to attack goes into solution. Those sulphides and sulphates which do not dissolve are removed from the head of the stream and are treated for the recovery of their values, as will be described.

While the apparatus employed in carrying out my method may be varied in its details, that now preferred is shown in the accompanying drawings, in which Fig. 1 is a flow sheet indicating, in a general manner, the arrangement of the various instrumentalities employed; Fig. 2 is an enlarged vertical cross-section taken on the line 2—2 of Fig. 1; Fig. 3 is a longitudinal sectional view taken vertically through a short portion of the trough, as on the line 3—3 of Fig. 4; Fig. 4 is a transverse sectional view through the trough, as on the line 4—4 of Fig. 1; Fig. 5 is a horizontal section through the trough, as on the line 5—5 of Fig. 4; Fig. 6 is a vertical section through the center of one of the terracotta pipes employed in agitating the sulphides in the solvent and for separating the lighter from the heavier sulphides in the stream; Fig. 7 is a transverse section on the line 7—7 of Fig. 6; Fig. 8 is a longitudinal sectional view on line 8—8 of Fig. 9, showing one of the pipes for introducing fluids into the stream and for circulating the sulphides through the pipes shown in Fig. 6, a portion of the pipe of Fig. 8 being broken away; Fig. 9 is a transverse section, somewhat enlarged, on the line 9—9 of Fig. 8; Fig. 10 is a longitudinal sectional view through one of the injectors, Figs. 11 and 11ª, taken together are a flow sheet.

In practice, I prefer to flow the sulphating agent by gravity in a stream through a long trough or channel, said agent comprising sulphuric acid (the sulphate of hydrogen) and ferric sulphate, both of which are products of the process. This long trough may be straight or may be shaped in any manner to meet the conditions of the terrain or the buildings where employed, such as superimposing one section above another section or forming it in a spiral or a series of spirals so as to have a flow of the solution in one direction while the sulphides being soluted are worked in the opposite direction, as will be explained. The form or arrangement which I prefer, however, is that shown in the drawings, in which the trough traverses a field and doubles back and forth upon itself in such a manner as to provide spaces for the location of pipe lines, air and gas conduits, tracks, thickeners, buildings and other appurtenances of the process wherever desired or needed. The stream has its source at a vessel 10, Fig. 1, where washing water is supplied from a source 11. A series of vessels like or similar to 10 are employed, the last of the series being shown at 12. It is at or adjacent the latter vessel that the first of the acid, or the acid-forming agent or agents, is introduced, and from that point on to the end of the stream the liquid is maintained more or less strongly acid.

The stream flows through a trough or channel, the walls of which are made impervious to water or to the acid. From its beginning at the vessel 12 to its far end at 13, it is inclined so as to cause the solvent to flow by gravity. If the current were too swift, it would be difficult if not impossible to propel the sulphides against it by the means employed. The fall of the stream is gentle and as regular as is practicable.

Starting at the vessel 12, the trough extends for some distance in what may be a straight line, as shown; then it turns about and flows substantially parallel with its first course to a point adjacent the said vessel, where it turns again and flows in the same direction as in the beginning. Thus, by a series of turns at each end of the field, the stream is caused to flow through a series of parallel courses, finally ending at 13. The trough in the first course, designated 14, is a single ditch or channel. In all other places in the stream, the trough is double, one course being separated from the adjacent course by a relatively thin partition. In Fig. 1, one of these double courses is designated 15 and 16; and Fig. 4 shows a section therethrough on the line 4—4 of Fig. 1, the partition being designated 17. As will be noted, the channel 16 is slightly lower than is the channel 15 to provide for the fall in the stream. The section is taken adjacent the end turn and the fall in the stream around this turn would be slight, as indicated. If the section were taken near the opposite end of the field the fall would be quite marked, as will be understood. The outer sides and the bottom of the trough are lined with an acid resistant material, as indicated at 18, and the partition 17 is formed of the same or similar material. This material may be vitrified and placed in position; but, for reason of economy, I prefer to use alternating coatings of asphaltum and silica until a lining of sufficient thickness and strength is obtained. The trough outside the linings may be composed of any material suitable in strength and initial cost, such as concrete.

The adjacent double courses are spaced apart to afford room for tracks 19 upon which cars 20 may be run to carry sulphides from a source of supply, indicated at 21. The tracks extend substantially the length of the field and are so arranged that sulphides may be supplied to the trough at any point along the courses 15, 16, 22 and 23, these courses being at or near the middle of the field. The sulphides are thus fed from the cars at or adjacent the midlength of the stream, although in some circumstances it will be advantageous to feed them elsewhere, as will be shown, in which case additional tracks may be laid.

The entire field occupied by the trough may be covered, as indicated at 24 in Figs. 3 and 4, suitable openings 25 being provided through which the sulphides are fed. It will usually be sufficient, however, to provide the cover over that portion of the field where the cars 20 are employed.

At short intervals throughout the greater part of the trough I place the tubular elements 26, shown in detail in Figs. 3, 6 and 7. These are intended to assist in the agitation of the solid particles in the stream and are used wherever there are sulphides or other matter present which it is desired be held in suspension. In Fig. 1, the small circles appearing along the stream indicate these elements, and they are shown as extending from substantially the source of the stream at 12 to and throughout a portion of the last course which leads to the mouth of the stream at 13. They are preferably made of terra-cotta, are tubular and have a flaring base. Extending across their bottoms are grooves 27 through which the solvent and the solids may pass to be ejected upwardly through the tubular stem. This ejecting action is attained by forcing a fluid, such as $SO_3$, $H_2SO_4$, air, water or ferric sulphate through a pipe 28 which extends downwardly through the respective tubular element 26 and rests, with a flaring base, upon the bottom of the trough. The pipe 28 is closed at its extreme lower end but has a series of ports 29 extending from the lower end of the tubular passage upwardly and outwardly through the base portion of the tube. These ports open above the grooves 27 in the elements 26 so as to direct the fluid against the inner walls of the latter. This causes the liquid and the solid matter therein to be drawn into the elements 26 and be projected up through the latter, thus setting up a circulation which causes the lighter particles to rise in the liquid above the heavier particles, the latter settling down to be again and again ejected through the elements. The heavier particles settling down from one element will, in part, approach the next element and be injected through it. Thus, in some degree, do these elements assist in moving the sulphides and other solid particles up the stream.

The pipes 28 are relatively long and they must be made up from some material which will not be attacked by the acid. Owing to their length and small diameter, they must be made strong. I therefore start with a length of tubing 30 of steel or other suitable metal, and extend through it a glass tube, permitting the ends of the latter to project beyond the ends of the metal. The lower end of the metal tube is slit and the prongs between the slits are bent or spread outwardly, as indicated in Fig. 9. Another glass tube is placed over the metal tube with its ends protruding and these protruding ends of the two tubes are fused together, thus fully encasing the metal and protecting it from the acid. The ports 29 extends between the prongs of the metal so that the latter may not contact the acid.

While, as stated, the circulation of the liquid and sulphides through the elements 26 serves in some degree to advance the sulphides up the stream, this result is attained principally through the use of injectors 31, the lower end of one of which is shown in Fig. 10. These injectors are similar to the tubes 30 in that they are long and of small diameter and are strengthened by an inner tubing 32 of steel or similar metal between two glass tubes which are projected at their ends and are sealed, thus protecting the metal from the acid. These injectors are nozzle-shaped at their lower ends and are so positioned in the trough that the air, water, $SO_3$, $H_2SO_4$, dissolved $Fe_2(SO_4)_3$, or any other fluid or combination of fluids projected through them drives the solid materials up stream. As many of the injectors 31 are used as may be necessary to cause this counter-current movement of the solids and the liquid. At some points it is desirable to cleanse the particles thoroughly and to accentuate the normal action of the injectors, as by causing them to drive the sulphides and liquids through acid-proof tubular elements on the bottom of the trough. Such an element is shown at 33 in Figs. 3 and 5. The injectors 31 may be extended upwardly at any convenient angle, Fig. 3 showing one at 31a which is almost vertical.

The agent or agents above designated, which are projected through the pipes 28 and injectors 31, may be supplied through any suitable connections, as through the pipes 34 of Fig. 4. These pipes are preferably extended across one end of the field, as indicated in Fig. 1, with branches between the double courses of the trough. By suitable valves 35, indicated in Fig. 4, any of the said agents or any combinations of the same may be admitted to any one of the pipes 28 and injectors 31 and thus be supplied to the stream at any point where its presence may be required or be advantageous.

As has been stated, the trough has a gradual fall throughout its length. Therefore the mouth of the stream at 13 is lower than its source at 12, and the liquid, with such sulphates as have not been previously removed, is discharged at 13 upon an extended and somewhat conical surface which I shall designate the hydrolyzing plain. This plain is shown, in part, in transverse section in Fig. 2. In plan view it is circular, except that the field containing the trough extends into it and occupies a quadrant of the circle, as appears from Fig. 1, the mouth 13 of the stream being directly above the apex of the cone. The stream flows out upon the top of the cone and spreads outwardly and downwardly, growing more and more shallow until it becomes a mere film and finally ceases to flow.

The hydrolyzing plain must be carefully prepared to render it acid proof and to prevent moisture from percolating upwardly through it. All soils, sands, rock or other materials having a natural affinity for acid are to be avoided. The best earth for a foundation is silicious alumina clay. Drains should be made in it to prevent water from backing up under the acid-proof coating and finding its way to the surface. The clay and silica are rolled down with a heavy road roller to pack them into place, after which alternating layers of acid-proof asphaltum and silica are rolled into place until a thick, heavy stratum is formed which is impervious to acid and water.

Having prepared the foundation, the lower gutter or drain 36 is next constructed of alternating layers of silica and asphaltum. It is given a slight fall or inclination so that any liquid thereon will flow to one of its ends, for a purpose hereinafter set forth. The lower segment or step 37 is formed of the materials just mentioned, but it is laid flat or without slope in any direction. It slightly overlaps the gutter 36 so as to deliver any drippings from it into the gutter. The remaining segments or steps are formed from the same materials, are laid flat and are arranged in overlapping relation, as shown, until the cap 38 is reached upon which the solution is delivered and from which it spreads in its descent over the many segments or steps.

While various groups of vessels, not previously mentioned, are employed, these will be referred to and their functions set forth in the detailed description of the method. Enough of the apparatus has now been described to make the method clear.

Mixed sulphide ores vary in their mineral contents and in the proportions in which these contents are present. While in some the sulphides of copper, for example, may be abundant, in others these sulphides may be scarcely more than a trace if any be present. In other ores the sulphides of iron or of zinc may predominate. The specific method of treatment according to my invention will depend somewhat upon the predominant sulphides in the mixed ores, as will be seen. For complete disclosure, however, it will be assumed that the ore employed contains substantial quantities of the sulphides of copper, iron, zinc, silver, lead, cobalt, nickel and manganese, with some sulphides of cadmium, arsenic, antimony and bismuth and small quantities of gold. The ore is first crushed and ground until it is in a finely pulverized condition, such as flotation concentrates. This exposes the greatest possible surface of the sulphides to the acid attack and makes possible the development of the greatest possible mass action. No roasting or other preliminary treatment, except crushing and grinding, is required.

In normal operation, the trough is substantially open throughout so that a stream of liquid, starting at or adjacent the vessel 12, flows slowly through it to the mouth 13, from which it spreads over the hydrolyzing plain. Near its source the stream is relatively strong in its acid content and is thus able to sulphate the more highly resistant sulphides. The ores are delivered into the stream adjacent its mid length. The various sulphides differ in their power of resistance to the sulphating agent, some being attacked and their sulphates dissolved in the liquid almost as soon as they enter the stream. The more resistant sulphides remain longer in the stream and are slowly moved up the latter until they enter their respective zones wherein the acid is strong enough to attack them. The acid grows weaker and weaker as it expends itself in these attacks, except as it is replenished as more specifically described hereinafter; but, at the same time, it grows richer and richer in dissolved sulphates.

But, before this normal and continuous operation can be economically practiced, it is necessary that the trough be properly charged with both the liquid and the sulphides. I therefore start by forming a pair of spaced, temporary dams of the sulphides in the otherwise empty trough. A quantity of the ore is now charged into the trough between these dams, and sulphuric acid and water are worked into the sulphides, the mass being kept in a state of agitation by the introduction of air through the pipes 28. Various reactions take place, the nature of which will be more specifically set forth hereinafter.

When the space between the dams in the trough is substantially filled with the solution, a third dam is formed to provide a space into which the overflow from between the first dams may collect. Whether this third dam shall be built up-stream or down-stream from the first two, depends upon the nature of the sulphides. But before this can be made plain, it is necessary to know that when a sulphate of a more highly resistant sulphide is formed, dissolved and is brought into the presence of a less highly resistant sulphide, the said sulphate is changed to the corresponding sulphide which is precipitated. For example, copper sulphide will be precipitated from a copper sulphate solution by the sulphides of zinc, iron or hydrogen in accordance with the following equations:

(1) $CuSO_4 + ZnS = CuS + ZnSO_4$;
(2) $7CuSO_4 + Fe_7S_8 = 7CuS + 7FeSO_4 + S$;
(3) $14CuSO_4 + 5FeS_2 + 12H_2O = 7Cu_2S + 5FeSO_4 + 12H_2SO_4$;
(4) $CuSO_4 + H_2S = CuS + H_2SO_4$.

It is seen by Equations (1) to (4) that copper displaces the metal (hydrogen being considered a metal) of the sulphides. Furthermore, the copper in copper sulphate will displace the metal in any sulphide in which the metal has less affinity for sulphur or greater affinity for oxygen than has copper, and the copper will become copper sulphide while the metal displaced becomes a sulphate. Copper sulphate, therefore, aids in the attack upon any of these sulphides. For example, in Equation 4, the $SO_4$ radical detaches itself from the Cu of the sulphate and attaches itself to the $H_2$ of the sulphide, while the S of the sulphide attaches itself to the Cu of the sulphate, thus bringing about what is termed a double decomposition. Because of the foregoing, copper sulphate becomes depleted from the solution as the solvent progresses into the undissolved mixture of sulphides and the copper is precipitated as a sulphide.

When, therefore, copper sulphate in considerable quantity is in the liquid between the first two dams, the third dam is formed up-stream, since, in the normal and continuous operation of the method, the copper sulphides are not sulphated until they are near the head of the stream. If, on the other hand, the sulphides are of a nature to change all the copper sulphate to sulphides, in accordance with Equations (1) to (4), the third dam is formed down stream, since it is evident there is comparatively little copper in the ore. The liquid between the first two dams is then allowed to flow into the space formed by building the third dam.

This work of constructing temporary dams and filling the spaces is continued until a sufficient length of the trough is occupied to establish conditions required for the practice of the continuous process. Then all of the dams are broken out and the injectors 31 are brought into action to sweep the residues from the dissolved materials and the more resistant sulphides toward the vessel 12, while the liquid containing some of the dissolved sulphates flows out for crystallization or hydrolyzation upon the hydrolyzing plain.

As stated, the stream has its source at the vessel 10 where wash water from 11 is supplied. Water from 11 is also conducted through one of the pipes 34, from which it may be discharged into the trough at any desired point, as is indicated in Fig. 1 by the arrows on the lines which branch from said pipe. The acid-forming agents heretofore mentioned are conducted through the other pipes shown at the right in Fig. 1 and are discharged into the liquid at any desired part of the trough. The reactions are exothermic, and the acid-forming agents are introduced where and in such quantities as to give the requisite strength to the solvent and to maintain the temperature of the latter at approximately the boiling point. When water is added, the heat of dilution aids in maintaining the desired temperature.

Assuming that the ores contain substantial quantities of the sulphides above mentioned, they are introduced into the flowing stream at the central courses 15, 16, 22 and 23. The finer particles of the sulphides which are most susceptible to attack are quickly sulphated and dissolved, liberating heat, forming $H_2S$, and setting up a violent ebullition which agitates the sulphides and causes the more soluble and lighter particles to rise and effervesce, while the heavier and more inert particles settle down in the trough, being advanced up-stream by the fluids introduced through the injectors 31 and being continually agitated by the fluids introduced through the pipes 28. The movement of the particles, due to the agitation and the up-stream advance, keeps the surfaces of the particles washed clean and in the most favorable condition for yielding to the acid attack.

While the finer particles of the sulphides of zinc, iron, cadmium, etc. are quickly and completely oxidized and dissolved, and their sulphates passed down the stream, the coarser particles remain longer and are moved a considerable distance up-stream before they finally disappear. This brings some of them into the zone where the acid is strong enough to begin its attack on the copper sulphides. At a point 39 in the first course 14, where it is assumed the dissolved copper sulphate becomes abundant, a portion of the stream is shunted out for special treatment. This feature will be more specifically described later and is here referred to in order to locate the copper-sulphate zone. The copper sulphate formed and dissolved below the said point 39 flows down the stream until it meets some of the sulphides which are more easily sulphated, where it is desulphated and the copper precipitated in sulphide form, in accordance with Equations (1) to (4). These precipitated sulphides join the other sulphides and solids in the stream and are moved back into the copper sulphate zone where they are again sulphated. This cycle, which comprises sulphating the copper sulphides, dissolving the copper sulphate, flowing the latter down stream, desulphating it, precipitating the copper sulphides and moving the latter back into the copper sulphate zone, may be repeated automatically over and over again, with the result that the copper sulphate is concentrated in its zone and is in condition for treatment for the recovery of its copper content. The more easily sulphated parts of the ore have been attacked and their sulphates flowed down the stream while the more resistant parts are moved farther up stream, thereby leaving the copper sulphate substantially isolated.

Since the special treatment of the copper sulphate after it has been shunted from the main stream involves the use of ferrous sulphide (FeS), I shall now state how the latter is obtained.

Among the various sulphides of iron in the ore there is usually a considerable quantity of the primary pyrite ($FeS_2$). When the sulphides are dumped into the stream and the reactions have somewhat subsided, this pyrite will be found floating as a scum upon the surface; and, if the solution becomes overheated, $SO_2$ is given off. At a suitable part of the trough, as indicated at 40 along the left-hand side of the field, I arrange a channel into which this floating scum of pyrite can be skimmed, the trough being provided with suitable floats, as at 41$^a$, to hold back the scum. The scum is led to a heater 41 where the feeble atom of S is driven off, leaving FeS, which is collected at 42. The S is passed through a condenser at 43 and is collected as a product at 44.

When there is a considerable quantity of copper in sulphide form in the ores, little attention need be given to the copper sulphate, since it will automatically collect in its proper zone in sufficient amounts for individual treatment. But when there is only a small amount of the copper sulphides, their sulphatization is retarded by the introduction of fresh ore or iron sulphide into the stream. The more readily attacked sulphides in the ore or the iron sulphide thus introduced will protect the copper sulphides from the acid attack; or, if some of the copper sulphides have become sulphated, the added sulphides will attack these sulphates and precipitate the copper sulphides, which sulphides will be carried farther up the stream to a point where they have concentrated in sufficient quantity to warrant their sulphatization, which may be effected by injecting sulphuric anhydride into the accumulated copper sulphide muck. In this simple manner, the copper sulphate may be concentrated in its proper zone, which is assumed to be at or adjacent the point 39, as stated. If the copper sulphate be in sufficient quantity and of sufficient purity to warrant it, a portion of the liquid may be diverted at once to electrolytic cells for the recovery of the metallic copper, the electrolyte being returned to the stream to help in maintaining the strength of the solution. If the solution does not contain enough copper sulphate to warrant this direct treatment, a part of it is shunted out at 39 and passed into thickeners 45, into which enough of the FeS from 42 is fed to react with the $H_2SO_4$ and produce $H_2S$, as follows:

(5) $FeS + H_2SO_4 = FeSO_4 + H_2S$

This $H_2S$ reacts with the copper sulphate to change it to the sulphide in accordance with Equation (4). Also $H_2S$, produced in redissolving the CuS precipitate, may be employed in precipitating copper sulphide for removal from the stream at any place where its removal is desirable.

The ferrous sulphate of Equation (5) goes into solution and, overflowing from the last thickener, is diverted back into the stream, as at 46. The precipitated and thickened CuS is filtered and washed at 47 and the filtrate and wash water are returned to the stream, as at 48. The filter cake is transferred to the vessels 49 where the CuS is again sulphated and dissolved by injecting $SO_3$ and water or by the addition of sulphuric acid, $H_2S$ being formed by the reaction. The vessels 49 are preferably hooded or otherwise constructed to collect this $H_2S$, which may be used at any point in the process, as is indicated in Fig. 11 of the flow sheet. From the vessels 49, the copper sulphate is passed to the electrolytic cells 50 where the metal content is deposited as electrolytic copper, the spent electrolyte being returned to the stream, as at 51.

When a sulphide is attacked by the sulphuric acid, hydrogen sulphide is formed, as is shown by Equation (5), which is typical. While this $H_2S$ is a gas, it is absorbed in the liquid and, if not removed, it seriously interferes with the reactions. It reduces the sulphates already formed, as in Equation (4), or it prevents the sulphates from forming. Further, there are some complex copper sulphides containing antimony, such as tetrahedrite ($Cu_8Sb_2S_7$), or arsenic, such as enargite ($Cu_3AsS_4$), which, while readily oxidized by $H_2SO_4$ when the resulting $H_2S$ is removed, are very slowly attacked by that acid when the $H_2S$ is allowed to remain. This is for the reason that, as the $H_2S$ is formed, it attaches itself to the sulphide particles and surrounds them as an envelope or film, thus insulating them from the acid. This results in the said complex sulphides being carried up stream far beyond the copper-sulphate zone before they yield, or, as is more than probable, beyond the head of the stream where they will be discharged with the insolubles. It is, therefore, important that $H_2S$ be prevented from accumulating in the stream; and this result is attained by the introduction of ferric sulphate, $Fe_2(SO_4)_3$, to the stream or by the generation of this sulphate in the stream. Ferric sulphate will combine with water if it cannot find something else to attack. Thus:

(6) $Fe_2(SO_4)_3 + 6H_2O =$
$$2Fe(OH)_3 + 3H_2SO_4$$

It attacks the $H_2S$ with which it contacts, the reaction being shown by the following:

(7) $Fe_2(SO_4)_3 + H_2S = 2FeSO_4 + H_2SO_4 + S$

Thus, not only is the $H_2S$ removed, but the acid is strengthened by another molecule of $H_2SO_4$. Further, as has been stated, air is added through the pipes 28 and injectors 31 wherever it may be needed; and its addition to the $2FeSO_4$ and the $H_2SO_4$ produced by Equation (7), gives back the ferric sulphate. Thus, (8) $4FeSO_4 + 2H_2SO_4 + O_2 =$
$$2Fe_2(SO_4)3 + 2H_2O$$

As has been stated, the treatment of the $CuSO_4$ with the FeS in the thickeners 45 results in the formation of $FeSO_4$, which is discharged into the stream, as at 46. This becomes one source of the ferrous sulphate from which the ferric sulphate is produced, as shown in Equation (8). But there are numerous other sources. As Equation (3) shows, $FeSO_4$ is produced when the $FeS_2$ in the ore is attacked by the $CuSO_4$. Further, such of the iron pyrites ($FeS_2$) as go into solution are acted on to form ferrous sulphate, the following representing an outline of what occurs without consideration of the exact mechanism of the reactions:

(9) $FeS_2 + 7O + H_2O = FeSO_4 + H_2SO_4$

The same is true of the pyrrhotite ($Fe_7S_8$), as is here shown:

(10) $Fe_7S_8 + 31O + H_2O = 7FeSO_4 + H_2SO_4$

Chalcopyrite, also, is acted on by the air introduced to form the ferrous sulphate, as follows:

(11) $CuFeS_2 + 8O = FeSO_4 + CuSO_4$

The sulphide bornite ($Cu_5FeS_4$) may also be present in the ore to contribute to the ferrous sulphate produced. In carrying out the process disclosed herein in which the solution is strongly acid and an excess of oxygen is present, the reaction would be as follows:

(12) $Cu_5FeS_4 + 2H_2SO_4 + 18O = 5CuSO_4 + FeSO_4 + 2H_2O$

If the solution becomes weak in acid, $H_2S$ will be formed; but in practice such a weak condition should not be permitted to obtain.

This equation shows a production of six molecules of sulphate at the expenditure of but two molecules of acid.

The reactions of Equations (9), (10), (11) and (12) may be brought about at any point in the stream where any pyrite, pyrrhotite, chalcopyrite, or bornite, is present by the injection of air through the pipes or injectors. If ferric sulphate in sufficient quantity to rid the solution of $H_2S$ is not produced in the several ways stated, or if it be required to some point where it cannot be supplied in any of said ways, it may be obtained by diverting a part or all of the overflow of $FeSO_4$ from the thickeners 45 to a storage tank at 52 and there treating it with sufficient $H_2SO_4$ and air to convert it into ferric sulphate in accordance with Equation (8).

Or, water may be used instead of the $H_2SO_4$, as follows:

(13) $6FeSO_4 + 3H_2O + 3O = 2Fe_2(SO_4)_3 + 2Fe(OH)_3$

The hydroxide thus produced may be filtered out leaving the ferric sulphate, which, whether produced in accordance with Equation (8) or (13), may be introduced into the stream wherever required, as is indicated by the line connecting the tank 52 with one of the pipes 34 (Fig. 1).

In addition to removing the $H_2S$ from the stream, the ferric sulphate reacts with other compounds in the ores and facilitates the operation. It attacks the pyrrhotite and the pyrites and produces ferrous sulphate. Thus,

(14) $Fe_7S_8 + 6Fe_2(SO_4)_3 + H_2SO_4 = H_2S + 19FeSO_4 + 7S$ and

(15) $FeS_2 + Fe_2(SO_4)_3 = 3FeSO_4 + 2S$

In each of these reactions, as well as in Equations 2 and 7, elemental sulphur is set free. This forms a sludge in and travels with the solution. It is removed before the liquid is treated for the recovery of the values from the more easily formed sulphates. If the sulphur and other matters forming the sludge become so thick in the stream as to protect the suspended sulphides from the acid, the stream is passed through a thickener to remove the sludge, and the latter is then destroyed by crystallizing and distilling off the sulphur. The remaining parts of the sludge may then be treated to recover whatever may be of value in them.

The ferric sulphate, if introduced in sufficient amount and in the proper parts of the stream, assists in the removal of this sulphur and, in so doing, furnishes an additional supply of ferrous sulphate and sulphuric acid. This is shown by the following equation:

(16) $2S + 6Fe_2(SO_4)_3 + 8H_2O = 12FeSO_4 + 8H_2SO_4$

A still further supply of ferric sulphate comes from the hydrolyzing plain of Fig. 2, as will be seen.

The sulphides and other solid materials in the lower part of the trough are violently agitated with air and enough sulphuric anhydride, obtained as hereinafter set forth, to maintain the temperature of the liquid at substantially the boiling point. The air supplies the oxygen for reactions (9) to (13), inclusive; and it seems, further, to attack such substances as cobaltite (CoAsS), millerite (NiS), sphalerite (ZnS), alabandite (MnS) and galena (PbS), which occur in many mixed sulphide ores, typical reactions being shown by the following equations which afford a theoretical explanation of the reactions:

(17) $2CoAsS + 11O = 2CoSO_4 + As_2O_3$,

(18) $NiS + 4O = NiSO_4$,

Since the solution is maintained at substantially the boiling point, it dissolves more of the sulphates than it can carry in solution at lower temperatures. If the sulphates should float down stream to a point where the heat of reaction is not sufficient to maintain the temperature high enough to hold all of them in solution and some begin to crystallize on the sides and bottom of the trough, more sulphuric anhydride is added at that point to raise the temperature there, thus to hold all the sulphates in solution.

If, on the other hand, the solution should become too hot, the primary pyrite ($FeS_2$) floating on the steam gives up its feeble atom of S which, combining with oxygen, produces the noxious $SO_2$. This nuisance can be abated by skimming off the hot pyrite into a solution of ferric sulphate, or by supplying a liberal quantity of that sulphate with some air to the stream to react with the $SO_2$, as follows:

(19) $Fe_2(SO_4)_3 + SO_2 + 2H_2O = 2FeSO_4 + 2H_2SO_4$.

From the above, it will be appreciated that ferrous sulphate, which may be obtained from various sources, performs a most important part in my method and that it may be introduced into the stream at any desired point and there oxidized into the ferric sulphate by the injection of air, as in Equations (8) and (13). However, I prefer to oxidize the ferrous into ferric sulphate outside the stream and then introduce the sulphate into the stream when needed.

After the copper has been removed from the solution, as above described, there remain in the upper end of the stream the sulphides and sulphates of silver, lead and gold, as well as any insolubles, such as $SiO_2$, all of which have been advanced up the stream by the fluids delivered principally through the injectors 31. Of these remaining sulphides, that of silver is the most susceptible to the acid attack, and the silver sulphate zone follows next after that of the copper sulphate. For purpose of description and illustration, it will be assumed that the silver sulphides are sulphated in the first course of the trough adjacent the head of the stream at 12.

After all the copper sulphides have gone into solution, the mud and all the solid particles are violently agitated with sulphuric anhydride and enough ferric sulphate to oxidize any $H_2S$ present. The finer particles of the silver sulphide are readily sulphated and the sulphate flowed down stream to be changed to the sulphide again by contacting with the copper or other sulphides there. Then these silver sulphides are moved back up stream into the zone where they were first sulphated and where the acid is strong, all as has been described in connection with the copper sulphides. Thus is the silver sulphate accumulated in the stream in its proper zone, the more readily attacked sulphides having been sulphated and their sulphates flowed down the stream while the lead, the gold, the insolubles and the residues have been moved farther up stream.

At the point of greatest concentration of the silver sulphate, a portion of the stream is shunted out for special treatment in the recovery of the silver. In Fig. 1, this point is assumed to be at 53. The liquid thus shunted is led through thickeners at 54 while still hot to remove all undissolved materials therefrom, after which the clarified liquid is passed through copper shavings at 55 to deposit out the silver, the remaining solution being then returned to the stream at 56. The silver may be precipitated by other known means if preferred.

If the sulphides are of such a nature as to hold the silver insoluble, or if the quantity of silver in the sulphides is so small as to make it impracticable to recover it by the method just set forth, then all of the silver is retained in the residue by charging a small quantity of iron sulphide into the mud at the bottom of the stream, after which the silver is recovered as presently described.

At the head of the stream, all the solid matter is ejected, as through one of the tubular elements 33, (Fig. 3), or is otherwise transferred, into the vessel 12, which is the last of the series of washers. From the vessel 12 to the first of the series at 10, the said matter is transferred counter to the current of water therethrough and the solids are thus thoroughly cleansed and made ready for the next step in the process.

At 57, Fig. 1, there is shown a tank containing a hot solution of salt, (NaCl). This brine is supplied to and is caused to flow through a series of thickeners 58—58$^a$ into a large thickener 59 adjacent the washers 10. Chlorine is charged into and agitated with the hot brine in the thickener 59 until the brine becomes saturated with it. The overflow from this thickener passes through a series of boxes 60 containing copper shavings, for a purpose hereinafter stated, and thence into a cooler at 61. From this cooler the brine is conducted back to the tank 57 or to the connection therefrom which leads to the thickener 58. The brine is, therefore, in a closed circuit and is passed therethrough any number of times, its strength being maintained by salt added to the tank 57. Preferably, the flow from the tank to the cooler 61 is by gravity. The brine may be heated in any suitable manner.

The solid materials from the washers 12 and 10 are passed into the large thickener 59 containing the chlorine-saturated brine, which is hot. There the lead sulphates are converted into lead chloride; and, if the silver has been caused to remain with the residues, as above described, it will likewise be converted into silver chloride. These chlorides go into solution, and the overflow from 59 is passed through the copper shavings in the vessel 60 to precipitate the silver, which may then be recovered. The hot solution of lead chloride is then cooled and crystallized at 61, and the lead is recovered, as by electrolysis in the cells 62, the metallic lead appearing as a product at 63. Any chlorine that escapes from the saturated brine or is set free in the cells 62 may be returned to the brine circuit, as is indicated, or any excess of it may be made into chlorides or hydrochloric acid.

The thickenings of the thickener 59 are passed through the series of thickeners 58$^a$—58 where they are agitated and moved upstream, in any suitable manner, until all the lead sulphate has been dissolved and returned to the thickener 59 as lead chloride. The thickenings of the last thickener 58 are filtered and washed at 64 and are made ready for treatment for the recovery of gold. While any suitable method may be employed for this treatment, I prefer and have indicated the cyanide method which will be discussed but briefly.

At 65 there is maintained a supply of cyanide solution which is delivered to a series of pachuca tanks 66—66$^a$ through which it flows and from which it passes to a suitable vessel at 67.

The residue from the filter 64 is transferred to the tank 66ª and is caused to travel through the series of pachuca tanks counter to the flow of the solution therein. The gold, as well as any silver which may remain, is dissolved out and is precipitated at the station 67 where it may be recovered. The final insolubles are discharged at 68.

By the time the stream has reached the floats 41 and the floating pyrites have been skimmed, it has accumulated a considerable quantity of sludge which may have so entangled some of the copper sulphides as to have carried them down the stream. In such case the stream is diverted, as at the point 69, through thickeners 70 to remove the sludge, the clarified liquid being passed back into the trough, as at 71. The thickenings may then be transferred to the copper-sulphate zone of the stream and the copper therein recovered, as has been described, or the sludge may be separately treated for the recovery of its copper.

After passing the said floats 41, no more ore is added, but the stream is kept hot by the introduction of acid or acid-forming agents, preferably sulphuric anhydride, in order to prevent the sulphates from crystallizing. Many of the reactions set forth continue until all the sulphides which are light enough to travel with the stream or which have become entangled in the sludge have been sulphated and dissolved. The stream is then heavily charged with sulphates of iron, zinc, nickel, etc., and contains some sulphates of cadmium, arsenic, antimony and bismuth. These latter sulphates may now be removed by the introduction of FeS from 42 into the stream, as at the point 72. This FeS reacts with the acid, in accordance with Equation (5), to form $H_2S$; and this $H_2S$ reacts with the sulphates of cadmium etc., as in typical Equation (4), to precipitate the metals as sulphides. The stream with these precipitated sulphides is now diverted, as at 73, into a series of settlers and thickeners 74 and through a filter at 75 where the precipitates and sludge are removed and transferred to a storage chamber 76 to be treated in any suitable manner for the recovery of such metal values as they may contain, the filtrate being returned to the stream, as indicated at 76ª.

As stated, the FeS used in the precipitation of the cadmium etc. is taken from the storage chamber 42. Since this FeS has been derived from the scum of floating pyrite, it may contain a substantial amount of copper sulphides which had become entrapped in the scum. In that case, the use of the FeS direct would not only be wasteful but would be objectionable because the precipitate in the filter 75 would be contaminated with copper sulphides. I accordingly prefer first to treat the FeS to generate $H_2S$, as in Equation (5). The $H_2S$ is then introduced into the stream to precipitate the cadmium and kindred sulphides which are removed at 74 and 75, as described. Or, $H_2S$ produced in redissolving CuS for the production of $CuSO_4$ to be employed in the production of electrolytic copper may also be employed in precipitating these sulphides. It may also be used in the thickeners 45 instead of FeS, as is obvious;

These sulphides being removed, the principal sulphates remaining are those of iron, zinc, nickel and cobalt. The most economical method now to be followed for the recovery of their values depends upon the relative amounts of iron sulphates in the solution. If the latter contains large amounts of zinc, nickel and cobalt sulphates and but a small quantity of the ferrous and ferric sulphates, it is preferable to remove the iron at once by precipitating it as hydroxides. I accordingly divert the stream, as at 77, through a series of digesters 78 into which I introduce a sufficient amount of zinc oxide to hydrolize the iron and form zinc sulphate according to the following reactions:

(20) $FeSO_4 + H_2O + ZnO = Fe(OH)_2 + ZnSO_4$; 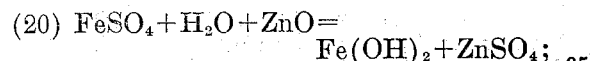

(21) $Fe_2(SO_4)_3 + 3H_2O + 3ZnO = 2Fe(OH)_3 + 3ZnSO_4$ 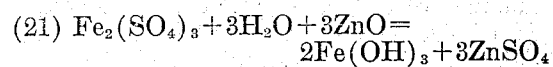

The zinc sulphate thus produced goes into solution, while the iron hydroxides may be filtered out at 79 and deposited at 80, the liquid being returned to the trough, as at 81.

The zinc sulphate obtained from the zinc sulphides in the ore and from reactions (20) and (21) is now treated for the production of the $SO_3$ for use in the stream to maintain the acid strength and the heat. If more $SO_3$ is thus produced than is necessary for these purposes, the surplus amount is used in the production of $H_2SO_4$. Accordingly, the clear liquid from the filter 79 is run out upon the hydrolyzing plain of Fig. 2 where the zinc sulphate is crystallized. A portion of the crystals are then dehydrated and dissociated into zinc oxide and $SO_3$, the temperature employed in dissociating being maintained low enough to prevent the $SO_3$ from breaking up into $SO_2$ and O. The zinc oxide thus formed may be used in the digesters 78, while the $SO_3$ is conducted to the appropriate pipe 34 to be discharged into the stream. The remaining portion of the zinc sulphate crystals may be dissolved and run into electrolytic cells for the deposition of zinc, the spent electrolyte being returned to the stream.

When the liquid from the digesters 78 and filters 79 contains sulphates, such as nickel and cobalt sulphates, in quantities large enough to interfere with the electrolytic deposition of the zinc, the solution is switched out of the trough, as at 82, through a series of digesters 83 into which a large amount of zinc oxide is fed. The liquid is thoroughly agitated and the said sulphates are converted into the oxides of the metals which are deposited. These oxides are permitted to accumulate in the digesters until a sufficient amount is present to warrant their treatment for recovery of their metal values. The reactions of the nickel and cobalt sulphates with the zinc oxide are as follows:

(22) $NiSO_4 + ZnO = NiO + ZnSO_4$,

(23) $CoSO_4 + ZnO = CoO + ZnSO_4$.

Such portions of the zinc sulphate as are required to produce the necessary $SO_3$ are returned to the stream, as at 84, and run out upon the hydrolyzing plain for crystallization, dehydration and dissociation, as above described. The remaining part of the zinc sulphate solution is passed through a filter at 85 and is then discharged into electrolytic cells at 86 for the recovery of the metallic zinc, the product, Zn, being indicated at 86ª. The spent electrolyte is passed through a suitable conduit 87 to the appropriate pipe 34 for return to the stream where needed.

As stated, the method just described is preferred only when there are relatively small amounts of the iron sulphates in the stream. If a large amount of iron sulphate be present, I prefer to crystallize the entire mineral content of the stream on the hydrolyzing plain, either with or without the prior removal of the cadmium, arsenic and kindred sulphates in the settlers 74 and filter 75. The complex crystals, consisting of the sulphates of iron, zinc and other soluble basic sulphates are gathered up from the plain and dehydrated at 87. Then the dehydrated mass is passed through dissociators 88 in which the temperature is so controlled as to dissociate only the ferrous and ferric sulphates, producing the corresponding iron oxides and sulphuric anhydride. The latter is conducted through 89 to its pipe 34 for introduction into the stream, as has been described. The resulting iron oxides and the remaining sulphates are washed at 90 with water from 91 to dissolve the sulphate crystals and leave the iron oxides. The sulphate solution from 90 is then passed through 92 to the electrolytic cells 86 for the recovery of the zinc. As before described, any metallic sulphate present in the solution in quantity sufficient to interfere with the recovery of the zinc may be removed by passing the solution through digesters, such as 83, where such sulphate is removed by zinc oxide.

If, in dissociating the iron sulphates in 88, the temperature should be inadvertently permitted to rise high enough to produce either basic zinc sulphate, $3ZnO(SO_3)_2$, or zinc oxide, the water used in the vessel 90 is acidulated to dissolve the basic zinc sulphate and the zinc oxide out of the iron oxides so that the zinc may be recovered.

This second method of segregating the iron from the other sulphates is advantageous because of the large amount of iron present in the form of ferrous, ferric and basic ferric sulphates which give up their sulphuric anhydride at temperatures below that at which the zinc sulphate dissociates, thus producing a large amount of $SO_3$ for use in the stream or for manufacturing sulphuric acid. The temperature employed should be below that at which $SO_3$ is dissociated into $SO_2 + O$. A further advantage is economy in the recovery of the zinc, its cost being measured by the washing at 90 and the electrolytic deposition of the zinc. This is the method which is specifically shown in the flow sheet, Figs. 11 and 11ª.

The third and most universal method of eliminating the iron is to oxidize and hydrolyze the sulphates of iron upon the hydrolyzing plain, the stream with its various sulphates being discharged thereon and allowed to flow in all directions down over the steps, becoming more and more shallow until it is a mere film and the flow ceases. Under these conditions, the ferrous sulphate rapidly oxidizes into ferric and basic ferric sulphate in accordance with reactions (6), (13), and:—

(24) $Fe_2(SO_4)_3 + H_2O = Fe_2O(SO_4)_2 + H_2SO_4$.

The basic ferric sulphate produced by the last equation is further oxidized by combining with two additional molecules of water into the sesquioxide of iron thus:—

(25) $Fe_2O(SO_4)_2 + 2H_2O = Fe_2O_3 + 2H_2SO_4$.

The hydrolyzed and oxidized iron produced by reactions (6), (13), (24) and (25), comprising $Fe(OH)_3$ and $Fe_2O_3$, piles upon the hydrolyzing plain while the resulting sulphuric acid joins the remaining sulphates and eventually gravitates with them into the gutter at the base of the plain, from which they may be drained into a conveniently located sump in which the zinc sulphate crystallizes. In Fig. 1, such a sump is indicated in dotted lines at 36ª, the same being located at the lower end of the gutter 36. The zinc sulphate crystals from the sump may then be dehydrated and dissociated for the production of $SO_3$ and ZnO, the former being conducted to its appropriate pipe 34 for use in the tubes 28 and injectors 31, or for the production of sulphuric acid, the ZnO being retained for use in the digesters 83 in case the nickel and cobalt become troublesome. However, it is not necessary to employ the sump 36ª, since the zinc sulphate crystallizes in the gutter 36 and may be transferred directly therefrom to a dehydrator and dissociator, such as 87 and 88, the $SO_3$ produced by dissociation being fed back through the pipe 89 to the stream, or used in making sulphuric acid, as will be described. The acid and such dissolved sulphates as remain in the sump or in the gutter after removal of the zinc sulphate crystals are returned to the trough or stream. If it be found that some of the sulphates of zinc, nickel or cobalt are hydrolyzing on the hydrolyzing plain, they are leached out by spraying the hydrolyzed mass with weak sulphuric acid, being thus returned to the sulphate form so that they may reach the gutter 36.

The iron oxides left in the vessel 90 in carrying out the second method and the iron hydroxides left on the hydrolyzing plain in the third method may be treated in any suitable manner for the recovery of their iron values.

Whatever $SO_3$ is produced that is not required to maintain the acid strength and temperature of the stream is converted into sulphuric and fuming sulphuric acid. This surplus $SO_3$ is led from the pipe 89 at a point 93 to the towers 94—94$^a$ which are connected in series, as shown. The $SO_3$ is caused to advance counter to a current of water, which is supplied from a source 95 to the end tower 94$^a$. The water absorbs the $SO_3$, producing sulphuric acid in the tower 94$^a$, the acid strength increasing until, in the tower 94 where the $SO_3$ is introduced, the liquid is fuming sulphuric acid. The latter is then transferred to a suitably constructed receptacle 96.

Should the quantity of cobalt and nickel in the solution be too great to remove from the zinc solution by digesting a large amount of zinc oxide in the solution in the digesters 83, an alternate method of recovering the zinc from the cobalt and nickel is to keep the solution strongly acid, which will hold the cobalt and nickel in solution while very pure zinc crystals form. As soon as any cobalt or nickel begins to contaminate the zinc crystals being deposited, the solution is withdrawn and fractional crystallization is practiced to separate the remaining zinc from the cobalt and nickel. The ultimate cobalt and nickel solution is treated in the well known way by rendering it basic and precipitating the cobalt with sodium hypochlorite and the nickel with sodium carbonate, which effects their separation.

This process may be employed in the production of copper sulphate, zinc sulphate, and ferrous and ferric sulphates. However, its chief use is in the production of the sulphate of hydrogen ($H_2SO_4$). It will be noted that the only places in the system where sulphur escapes concentration into the sulphate of hydrogen is in the distillation of the feeble atom of sulphur from pyrite, in the insoluble sulphate of lead, in the accidental losses, such as the escape of $SO_2$ and $H_2S$ from the solution, and in the sulphur which is precipitated and wasted. After all of the branches of the process are in full operation and there is no further capacity to utilize the accumulating $SO_3$ ion in the stream, all of the sulphur of the sulphides that are converted into sulphates (with the exception of lead sulphate) is eventually dissociated from its metal bases and is combined with $H_2O$ to produce the sulphate $H_2SO_4$. I prefer to concentrate the $SO_3$ ions into ferric sulphate, which breaks into $Fe_2O_3$ and $SO_3$ at temperatures below the dissociating point of $SO_3$ into $SO_2+O$.

I claim:

1. The herein described method which comprises maintaining a flowing stream of liquid sulphating material in an elongated and unobstructed trough, the strength of the said material increasing in the direction of the source of the stream, introducing a mixture of two sulphides in finely divided condition into said stream at a point where the strength of the material is sufficient to attack the more susceptible sulphide only, thus converting it into the corresponding sulphate which dissolves in the stream and flows with it, and moving the remaining and less susceptible sulphide up the stream into a region where the sulphating strength of the material is sufficient to attack it and convert it into its corresponding sulphate which dissolves in the stream, whereby the sulphates are separated in the stream and made available for separate treatment for the recovery of their respective values.

2. The herein described method which comprises maintaining a flowing stream of liquid sulphating material in an elongated and unobstructed trough, the strength of the said material increasing in the direction of the source of the stream, introducing a mixture of two sulphides in finely divided condition into said stream at a point where the strength of the material is sufficient to attack the more susceptible sulphide only, thus converting it into the corresponding sulphate which dissolves in the stream and flows with it, moving the remaining and less susceptible sulphide up the stream into a region where the sulphating strength of the material is sufficient to attack it and convert it into its corresponding sulphate which dissolves in the stream, whereby the sulphates are separated in the stream, treating the separated sulphates for the recovery of their respective values, and injecting the acid contents of the sulphates into the bottom of the stream to move the less susceptible sulphide therein and to maintain the sulphating strength of the stream.

3. The herein described method which comprises maintaining a flowing stream of liquid sulphating material in an elongated open and unobstructed trough, the strength of the said material increasing in the direction of the source of the stream, maintaining the liquid in the stream at substantially its boiling point, introducing a mixture of iron sulphide in the form of $FeS_2$ and copper sulphide into the stream, said sulphides being in finely divided condition, moving the copper sulphide up the stream into a zone where the strength of the sulphating material is sufficient to convert it into the sulphate of copper, withdrawing the said copper sulphate from the stream, removing the $FeS_2$ from the surface of the stream, heating it to convert it into FeS, introducing the FeS into the removed copper sulphate to convert the latter into $FeSO_4$ and CuS, removing the CuS by filtration, treating the CuS to reconvert it into copper sulphate, recovering the copper from the latter, converting the $FeSO_4$ into $Fe_2(SO_4)_3$ and introducing the $Fe_2(SO_4)_3$ into the stream to maintain its temperature and sulphating strength.

4. The herein described method which comprises maintaining a flowing stream of liquid sulphating material, introducing mixed sulphides in finely divided condition into said stream, converting the various sulphides in the stream into the corresponding sulphates, removing certain of said sulphates from the stream for recovery of their metal values, flowing the stream with its remaining sulphates in solution onto an extended plain over which the stream may spread and on which sulphates may crystallize, removing the sulphate crystals from the plain, dehydrating the removed crystals, dissociating certain of the crystals into the corresponding metal oxide and sulphuric anhydride, and injecting the sulphuric anhydride into the stream to maintain the acid strength of the latter and to agitate the sulphides therein while undergoing sulphatization.

5. The herein described method which comprises maintaining a flowing stream of liquid sulphating material, introducing mixed sulphides in finely divided condition into said stream, said sulphides containing sulphides of iron and zinc, converting the various sulphides in the stream into the corresponding sulphates, removing certain of said sulphates from the stream for recovery of their metal values, flowing the stream with its iron and zinc sulphates in solution onto an extended plain over which the stream may spread and on which the iron and zinc sulphates may crystallize, removing the iron and zinc sulphate crystals from the plain, dehydrating said crystals, dissociating the iron sulphate crystals to form iron oxide and sulphuric anhydride, injecting the sulphuric anhydride into the stream to maintain the acid strength of the latter and to agitate the sulphides therein while undergoing sulphatization, washing the zinc sulphate from the iron oxide and recovering the zinc from its sulphate.

6. The herein described method which comprises maintaining a flowing stream of liquid sulphating material, introducing mixed sulphides in finely divided condition into said stream, converting the various sulphides in the stream into the corresponding sulphates, flowing the stream with certain of its sulphates in solution onto an extended plain over which the stream may spread and on which the sulphates may crystallize, and removing the crystals from the plain for treatment for the recovery of their metal values.

7. The herein described method which comprises maintaining a flowing stream of liquid sulphating material, introducing mixed sulphides in finely divided condition into said stream, converting the various sulphides in the stream into the corresponding sulphates, flowing the stream with certain of its sulphates in solution onto an extended plain over which the stream may spread and on which sulphates may crystallize, removing the crystals from the plain, dehydrating all the removed crystals and dissociating the crystals of the sulphate of one metal into the corresponding metal oxide and $SO_3$, injecting such of the said $SO_3$ into the stream as is required to maintain its sulphating strength, and combining the remainder of the $SO_3$ with water to produce sulphuric acid.

8. The herein described method which comprises maintaining a flowing stream of liquid sulphating material, introducing mixed sulphides in finely divided condition into said stream, converting the various sulphides in the stream into the corresponding sulphates, the sulphates being dissolved in the stream, removing certain of the dissolved sulphates from the stream for recovery of their metal values, flowing the stream with other of its dissolved sulphates onto an extended plain over which the stream may spread and on which sulphates may crystallize, removing the crystallized sulphates from the plain, dehydrating all of the removed crystals, dissociating the crystals of the sulphate of one metal into the corresponding metal oxide and $SO_3$, and injecting the $SO_3$ into the stream to maintain its sulphating strength.

9. The herein described method which comprises maintaining a flowing stream of liquid sulphating material, introducing mixed sulphides in finely divided condition into said stream, the mixed sulphides containing copper sulphide, converting the various sulphides in the stream into the corresponding sulphates, the sulphates being dissolved in the stream, removing the dissolved copper sulphate from the stream for recovery of its metal value, flowing the stream with other of its dissolved sulphates onto an extended plain over which the stream may spread and on which the contained sulphates may crystallize, removing the crystallized sulphates from the plain, dehydrating all of the removed crystals, dissociating the crystals of the sulphate of one metal into the corresponding metal oxide and $SO_3$, injecting enough of the $SO_3$ into the stream to maintain its sulphating strength, and combining the remainder of the $SO_3$ with water to produce sulphuric acid.

10. The herein described method which comprises maintaining a flowing stream of liquid sulphating material, introducing mixed sulphides in finely divided condition into said stream, said sulphides containing the sulphides of copper, iron and zinc, the said sulphides being introduced into the stream intermediate its ends, converting the sulphides of iron and zinc into the corresponding sulphates which become dissolved in the stream and flow with it, moving the copper sulphide up the stream from the place of introduction of the sulphides, converting the copper sulphides into copper sulphate, treating the copper sulphate for recovery of its metal values, flowing the stream with its iron and zinc sulphates in solution onto an extended plain over which the stream may spread and on which the iron and zinc sulphates may crystallize, removing the iron and zinc sulphate crystals from the plain, dehydrating said crystals, dissociating the iron sulphate crystals to form iron oxide and sulphuric anhydride, the dissociating temperature being maintained below that at which the zinc sulphate crystals would dissociate, injecting the sulphuric anhydride into the stream in an amount sufficient to maintain the acid strength of the latter, and combining the remainder of the $SO_3$ with water to produce sulphuric acid.

11. The herein described method which comprises maintaining a flowing stream of liquid sulphating material, introducing mixed sulphides in finely divided condition into said stream, said sulphides containing the sulphides of iron, zinc, cadmium and nickel, converting said sulphides in the stream into the corresponding sulphates, removing the sulphates of cadmium and nickel from the stream, flowing the stream with its iron and zinc sulphates in solution onto an extended plain over which the stream may spread and on which the iron and zinc sulphates may crystallize, removing the iron and zinc sulphate crystals from the plain, dehydrating said crystals, dissociating the iron sulphate crystals to form iron oxide and sulphuric anhydride, the temperature used in dissociating the iron sulphate crystals being lower than that required to dissociate the zinc sulphate crystals, injecting the sulphuric anhydride into the stream to maintain the strength of the liquid and to agitate the sulphides therein while undergoing sulphatization, washing the zinc sulphate from the iron oxide and recovering the zinc from its sulphate.

12. The herein described method which comprises maintaining a flowing stream of liquid sulphating material, introducing mixed sulphides in finely divided condition into said stream, said sulphides containing sulphides of iron, zinc, cadmium, arsenic, antimony and bismuth and some of the iron sulphides being $FeS_2$, converting the various sulphides, except the $FeS_2$, in the stream into the corresponding sulphates which become dissolved in the stream and flow with it, removing the $FeS_2$ from the stream, heating the removed $FeS_2$ to drive off its feeble atom of S and produce FeS, using FeS thus obtained to precipitate the sulphides of cadmium, arsenic, antimony and bismuth, removing the said precipitates from the stream, flowing the stream with its iron and zinc sulphates in solution onto an extended plain over which the stream may spread and on which the iron and zinc sulphates may crystallize, removing the iron and zinc crystals from the plain, dehydrating said crystals, dissociating the iron sulphide crystals to form iron oxide and sulphuric anhydride, the temperature used in dissociating the iron sulphate crystals being maintained below that at which the zinc sulphate crystals dissociate, injecting the sulphuric anhydride into the stream to maintain the acid strength of the latter, separating the zinc sulphate from the iron oxide and recovering the zinc from its sulphate.

13. The herein described method which comprises maintaining a flowing stream of liquid sulphating material, introducing mixed sulphides in finely divided condition into said stream, said sulphides containing sulphides of iron, zinc, cadmium, arsenic, antimony and bismuth and some of the iron sulphides being $FeS_2$, converting the various sulphides, except the $FeS_2$, in the stream into the corresponding sulphates which become dissolved in the stream and flow with it, removing the $FeS_2$ from the stream, heating the removed $FeS_2$ to drive off its feeble atom of S and produce FeS, introducing FeS thus obtained into the flowing stream to precipitate the sulphides of cadmium, arsenic, antimony and bismuth, removing the said precipitates from the stream, flowing the stream with its iron and zinc sulphates in solution onto an extended plain over which the stream may spread and on which the iron and zinc sulphates may crystallize, removing the iron and zinc crystals from the plain, dehydrating said crystals, dissociating the iron sulphide crystals to form iron oxide and sulphuric anhydride, the temperature used in dissociating the iron sulphate crystals being maintained below that at which the zinc sulphate crystals dissociate, injecting such of the sulphuric anhydrate into the stream as is necessary to maintain the acid strength of the latter and to agitate the sulphides therein while undergoing sulphatization, combining the remainder of the sulphuric anhydride with water to produce sulphuric acid, washing the zinc sulphate from the iron oxide, recovering the zinc from its sulphate in electrolytic cells, and returning the electrolyte to the stream.

14. The herein described method which comprises maintaining a flowing stream of liquid sulphating material in an elongated, unobstructed and open trough, introducing a mixture of sulphides in finely divided condition into said stream intermediate its ends, the lighter and more easily sulphated portions of the sulphides flowing with the upper portion of the stream down the latter until they are sulphated and dissolved in the stream, injecting acid-forming materials into the bottom of the stream to agitate the heavier and more inert sulphides which sink to the bottom and to cause them to move up the stream in a direction counter to the flow of the liquid in the upper part thereof, and sulphating said heavier sulphides and dissolving them in portions of the stream other than those portions where the lighter sulphides were sulphated and dissolved, whereby the various sulphates are separated in the stream for individual treatment.

15. The herein described method which comprises maintaining a flowing stream of liquid sulphating material in an elongated, unobstructed and open trough, introducing a mixture of sulphides in finely divided condition into said stream intermediate its ends, the lighter and more easily sulphated portions of the sulphides flowing with the upper portion of the stream down the latter until they are sulphated and dissolved in the stream, agitating the heavier and more inert sulphides which sink to the bottom and causing them to move up the stream in a direction counter to the flow of the liquid in the upper part thereof, sulphating said heavier sulphides and dissolving them in portions of the stream other than those portions where the lighter sulphides were sulphated and dissolved, whereby the various sulphates are separated in the stream, treating the separated sulphates for the recovery of their respective metal values, and injecting the acid contents of the sulphates into the bottom of the stream to agitate and move the said heavier sulphides up the stream and to maintain the strength of the latter.

16. The herein described method which comprises maintaining a flowing stream of liquid sulphating material in an elongated trough, the acid strength of the said material increasing in the direction of the source of the stream, introducing a mixture of sulphides in finely divided condition into said stream wherein the various sulphides are dissolved and the sulphates separated from one another in the stream, removing certain of the sulphates from the stream, flowing the stream with the other sulphates therein onto an extended plain whereon the sulphates become crystallized, treating the sulphates removed form the stream and the crystallized sulphates from the plain for the recovery of their respective metal values with the resultant production of sulphuric anhydride, ferric sulphate and sulphuric acid and injecting the said sulphuric anhydride, ferric sulphate, sulphuric acid, air and water into the bottom of the stream wherever required to maintain the sulphating strength and temperature of the stream and to move the sulphides in the bottom of the trough against the current of the stream therein into regions where the liquid is strong enough to sulphate them.

17. The herein described method which comprises maintaining a flowing stream of liquid sulphating material in an elongated and unobstructed trough, introducing a mixture of sulphides in finely divided condition into said stream at a point intermediate its ends, the lighter and more easily sulphated particles of the sulphides remaining in suspension in the stream and being carried with it below the point of introduction of the sulphides where they are sulphated and their sulphates dissolved, moving the heavier particles of the sulphides up the stream from the point of introduction of the sulphides into regions where they become sulphated, dissolved and separated from one another, and treating the sulphates for the recovery of their respective metal values.

18. The herein described method which comprises maintaining a flowing stream of liquid sulphating material in an elongated and unobstructed trough, introducing a mixture of sulphides in finely divided condition into said stream at a point intermediate its ends, the lighter and more easily sulphated particles of the sulphides remaining in suspension in the stream and being carried with it below the point of introduction of the sulphides where they are sulphated and their sulphates dissolved, moving the heavier particles of the sulphides up the stream from the point of introduction of the sulphides into the latter and into regions where they become sulphated, dissolved and separated from one another, treating the sulphates for the recovery of their respective metal values, and injecting the acid contents of the sulphates into the bottom of the stream at points where needed to maintain the sulphating strength of the liquid and to cause the heavier particles of the sulphides to move up the stream.

19. The herein described method which comprises maintaining in an elongated and unobstructed trough a flowing stream of liquid sulphating material, the acid strength of which increases in the up-stream direction, introducing into said stream, intermediate its ends, a mixture of comminuted sulphides containing the sulphides of copper, sulphides which are more easily attacked by the sulphating material than is the copper sulphide and other sulphides which are more resistant to the attack than is the copper sulphide, sulphating the more easily attacked sulphides, dissolving their sulphates and flowing the latter down the stream below the point of introduction of the sulphides, moving the copper sulphide up the stream from the point of its introduction into a part of the stream where the acid strength is sufficient to attack and sulphate it, dissolving the copper sulphate in the stream and treating it for the recovery of its metal value, moving the more resistant sulphides up the steam beyond the point where the copper sulphide was sulphated into respective parts where the acid strength of the liquid is sufficient to sulphate them, moving certain of the sulphates beyond the head of the stream and treating them for the recovery of their respective metal values, and introducing the acid contents of the several treated sulphates back into the stream to maintain its acid strength.

20. The herein described method which comprises maintaining a body of liquid sulphating material, the acid strength of which varies from point to point in the body; introducing into said body a mixture of metallic sulphides containing the sulphides of iron and zinc, moving the sulphides in said body to points where the strength of the material is sufficient to attack them; sulphating the various sulphides into the corresponding sulphates, crystallizing the sulphates of iron and zinc and dehydrating the mixed crystals, heating the dehydrated crystals to a temperature sufficient to dissociate the iron sulphate crystals only, forming iron oxide and $SO_3$, dissolving the zinc sulphate crystals, separating the dissolved zinc sulphate from the iron oxide, treating the zinc sulphate for the recovery of its metal value, and introducing such part of the $SO_3$ into the body at its various points as is required to maintain its acid strength, at those points.

In testimony whereof I have signed my name to this specification.

GEORGE CAMPBELL CARSON.